United States Patent
Kim et al.

(10) Patent No.: US 11,748,614 B2
(45) Date of Patent: Sep. 5, 2023

(54) ARTIFICIAL INTELLIGENCE DEVICE FOR CONTROLLING EXTERNAL DEVICE

(71) Applicant: LG ELECTRONICS INC., Seoul (KR)

(72) Inventors: Dongwook Kim, Seoul (KR); Kunwoo Kim, Seoul (KR); Chala Park, Seoul (KR); Hojun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 761 days.

(21) Appl. No.: 16/562,956

(22) Filed: Sep. 6, 2019

(65) Prior Publication Data
US 2020/0005145 A1 Jan. 2, 2020

(51) Int. Cl.
*G06N 3/08* (2023.01)
*G06N 5/04* (2023.01)
*G05B 13/02* (2006.01)

(52) U.S. Cl.
CPC ............. *G06N 3/08* (2013.01); *G05B 13/021* (2013.01); *G05B 13/0265* (2013.01); *G06N 5/04* (2013.01)

(58) Field of Classification Search
CPC .... G05B 13/021; G05B 13/0265; G06N 3/08; G06N 5/04; G06N 3/0481; G06N 20/00; G06F 3/0482; G06F 3/0484; H04L 12/2827
See application file for complete search history.

(56) References Cited

U.S. PATENT DOCUMENTS

| 2008/0180228 | A1* | 7/2008 | Wakefield | G08C 17/02 |
| | | | | 340/4.62 |
| 2015/0169335 | A1 | 6/2015 | Oh et al. | |
| 2016/0259905 | A1 | 9/2016 | Park et al. | |
| 2016/0358443 | A1* | 12/2016 | True | G08B 25/08 |
| 2017/0053210 | A1* | 2/2017 | Duong | G06N 20/00 |

(Continued)

FOREIGN PATENT DOCUMENTS

| KR | 10-2015-0068721 A | 6/2015 |
| KR | 10-2016-0108051 A | 9/2016 |
| KR | 10-2017-0048990 A | 5/2017 |

OTHER PUBLICATIONS

Andreas Enslin, "Household appliance with a communication device" (EP 2630904 English Translation/Original Document), Feb. 27, 2012, ip.com machine translation/Espacenet original document (Year: 2012).*

*Primary Examiner* — Robert E Fennema
*Assistant Examiner* — Christopher W Carter
(74) *Attorney, Agent, or Firm* — Birch, Stewart, Kolasch & Birch, LLP

(57) ABSTRACT

An artificial intelligence device for controlling an external device includes a display unit, and a processor configured to acquire a distance between the artificial intelligence device and a first external device, determine whether the acquired distance is less than a reference distance, display a first operation menu item for controlling the first external device on the display unit when the acquired distance is less than the reference distance, acquire situation information when the acquired distance is equal to or greater than the reference distance, determine a second external device as an object to be controlled based on the acquired situation information, and display a second operation menu item for controlling the determined second external device on the display unit.

18 Claims, 9 Drawing Sheets

(56) References Cited

U.S. PATENT DOCUMENTS

2017/0115940 A1* 4/2017 Byeon .................. G06F 3/14
2019/0213639 A1* 7/2019 Greenberger ...... G06Q 30/0267
2020/0302313 A1* 9/2020 Jeong .................. G06F 3/167

* cited by examiner

FIG. 8

| USAGE TIME | POSITION OF USER | TYPE OF EXTERNAL DEVICE |
|---|---|---|
| 8 ~ 10시 | MAIN ROOM | TV |
| 10 ~ 12시 | LIVING ROOM | AIR CONDITIONER |
| 12 ~ 13시 | PORCH | WASHING MACHINE |

ARTIFICIAL INTELLIGENCE DEVICE FOR CONTROLLING EXTERNAL DEVICE

CROSS REFERENCE TO RELATED APPLICATIONS

This non-provisional application claims the benefit under 35 U.S.C. § 119(a) to Patent Application No. 10-2019-0094273, filed in the Republic of Korea on Aug. 2, 2019, all of which is hereby expressly incorporated by reference into the present application.

BACKGROUND

The present invention relates to an artificial intelligence device for controlling an external device.

Competition for voice recognition technology which has started in smartphones is expected to become fiercer in the home with diffusion of the Internet of things (IoT).

In particular, an artificial intelligence (AI) device capable of issuing a command using voice and having a talk is noteworthy.

A voice recognition service has a structure for selecting an optimal answer to a user's question using a vast amount of database.

A voice search function refers to a method of converting input voice data into text in a cloud server, analyzing the text and retransmitting a real-time search result to a device.

Recently, technology of providing a voice command to an artificial intelligence device through a voice recognition service and enabling the artificial intelligence device to control another external device has appeared.

However, there is a need for a method of immediately controlling an external device when network connection between an artificial intelligence device and a server is not established or when a voice recognition service cannot be provided.

SUMMARY

An object of the present invention is to provide an artificial intelligence device capable of automatically determining a device to be controlled by a user using artificial intelligence and providing an operation screen of the determined device to be controlled.

An artificial intelligence device for controlling an external device according to an embodiment of the present invention includes a display unit, and a processor configured to acquire a distance between the artificial intelligence device and a first external device, determine whether the acquired distance is less than a reference distance, display a first operation menu item for controlling the first external device on the display unit when the acquired distance is less than the reference distance, acquire situation information when the acquired distance is equal to or greater than the reference distance, determine a second external device as an object to be controlled based on the acquired situation information, and display a second operation menu item for controlling the determined second external device on the display unit.

A method of operating an artificial intelligence device for controlling an external device according to another embodiment of the present invention includes acquiring a distance between the artificial intelligence device and a first external device, determining whether the acquired distance is less than a reference distance, displaying a first operation menu item for controlling the first external device on a display unit of the artificial intelligence device when the acquired distance is less than the reference distance, acquiring situation information when the acquired distance is equal to or greater than the reference distance, determining a second external device as an object to be controlled based on the acquired situation information, and displaying a second operation menu item for controlling the determined second external device on the display unit.

BRIEF DESCRIPTION OF THE DRAWINGS

FIG. 8 is a view illustrating a training data set used to learn the device-to-be-used inference model.

DETAILED DESCRIPTION OF THE EMBODIMENTS

<Artificial Intelligence (AI)>

Figure 1:
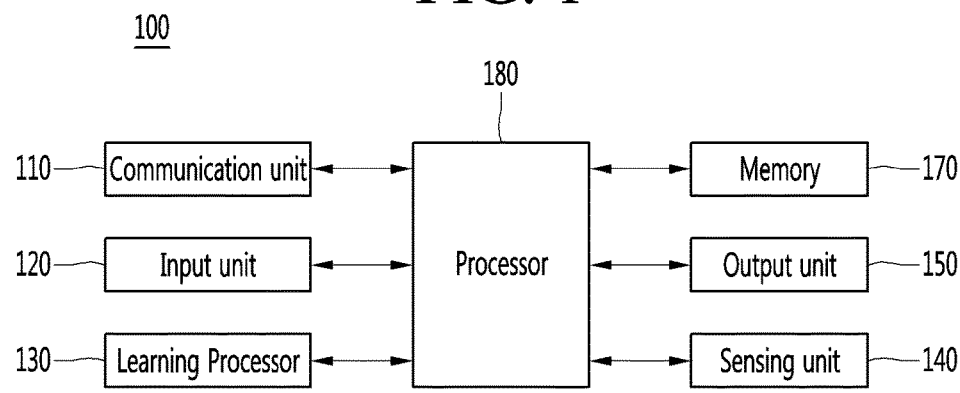
FIG. 1 is a view showing an artificial intelligence (AI) device according to an embodiment of the present invention.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
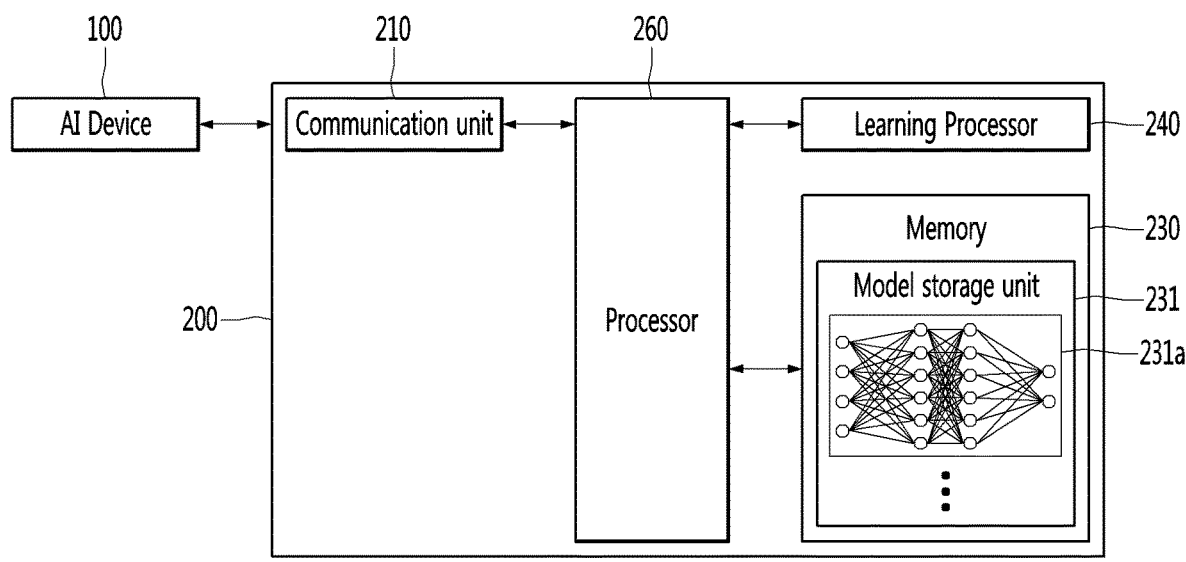
FIG. 2 is a view showing an AI server according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
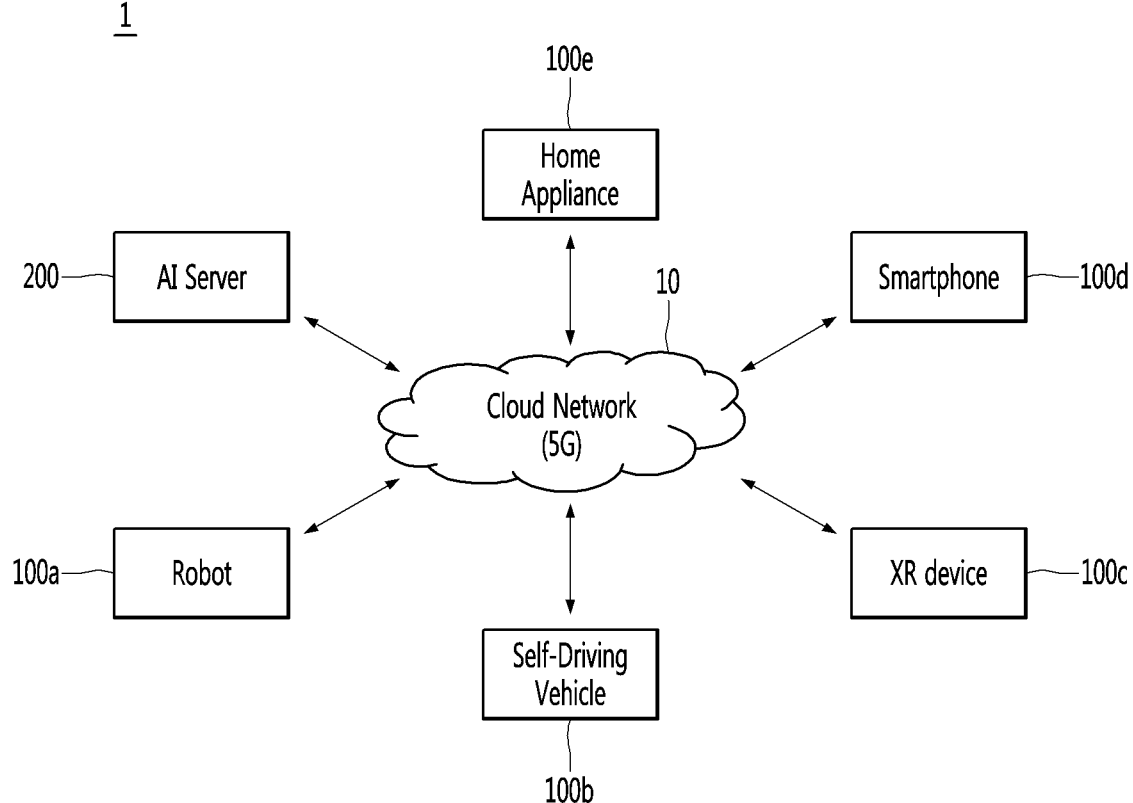
FIG. 3 is a view showing an AI system according to an embodiment of the present invention.

FIG. 3 illustrates an AI system 1 according to an embodiment of the present invention.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
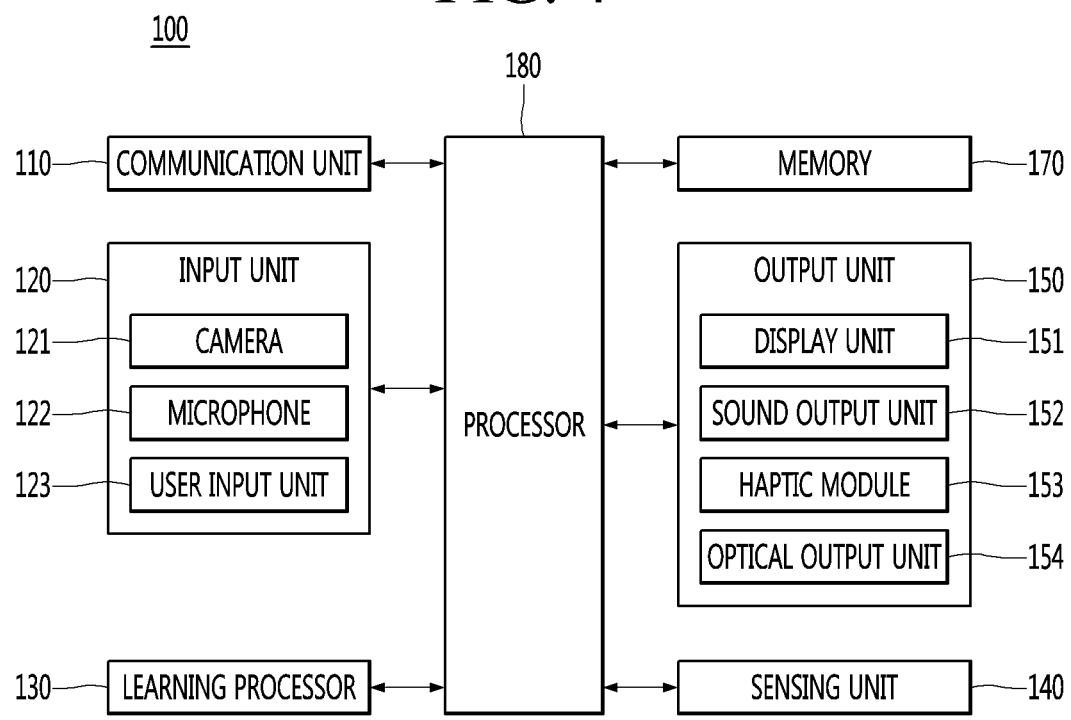
FIG. 4 is a view showing an artificial intelligence (AI) device according to another embodiment of the present invention.

FIG. 4 shows an AI device 100 according to an embodiment of the present invention.

A repeated description of FIG. 1 will be omitted.

Referring to FIG. 4, an input unit 120 may include a camera 121 for receiving a video signal, a microphone 122 for receiving an audio signal and a user input unit 123 for receiving information from a user.

Audio data or image data collected by the input unit 120 may be analyzed and processed as a control command of the user.

The input unit 120 receives video information (or signal), audio information (or signal), data or information received from the user, and the AI device 100 may include one or a plurality of cameras 121 for input of the video information.

The camera 121 processes an image frame such as a still image or a moving image obtained by an image sensor in a video call mode or a shooting mode. The processed image frame may be displayed on a display unit 151 or stored in a memory 170.

The microphone 122 processes external acoustic signals into electrical sound data. The processed sound data may be variously utilized according to the function (or the application program) performed in the AI device 100. Meanwhile, various noise removal algorithms for removing noise generated in a process of receiving the external acoustic signal is applicable to the microphone 122.

The user input unit 123 receives information from the user. When information is received through the user input unit 123, a processor 180 may control operation of the AI device 100 in correspondence with the input information.

The user input unit 123 may include a mechanical input element (or a mechanical key, for example, a button located on a front/rear surface or a side surface of the terminal 100, a dome switch, a jog wheel, a jog switch, and the like) and a touch input element. As one example, the touch input element may be a virtual key, a soft key or a visual key, which is displayed on a touchscreen through software processing, or a touch key located at a portion other than the touchscreen.

An output unit 150 may include at least one of a display unit 151, a sound output unit 152, a haptic module 153, and an optical output unit 154.

The display unit 151 displays (outputs) information processed in the AI device 100. For example, the display unit 151 may display execution screen information of an application program executing at the AI device 100 or user interface (UI) and graphical user interface (GUI) information according to the execution screen information.

The display unit 151 may have an inter-layered structure or an integrated structure with a touch sensor so as to implement a touchscreen. The touchscreen may provide an output interface between the terminal 100 and a user, as well as functioning as the user input unit 123 which provides an input interface between the AI device 100 and the user.

The sound output unit 152 may output audio data received from a communication unit 110 or stored in the memory 170 in a call signal reception mode, a call mode, a record mode, a voice recognition mode, a broadcast reception mode, and the like.

The sound output unit 152 may include at least one of a receiver, a speaker, a buzzer or the like.

The haptic module 153 may generate various tactile effects that can be felt by a user. A representative example of tactile effect generated by the haptic module 153 may be vibration.

The optical output unit 154 may output a signal indicating event generation using light of a light source of the AI device 100. Examples of events generated in the AI device 100 may include a message reception, a call signal reception, a missed call, an alarm, a schedule notice, an email reception, an information reception through an application, and the like.

Figure 5:
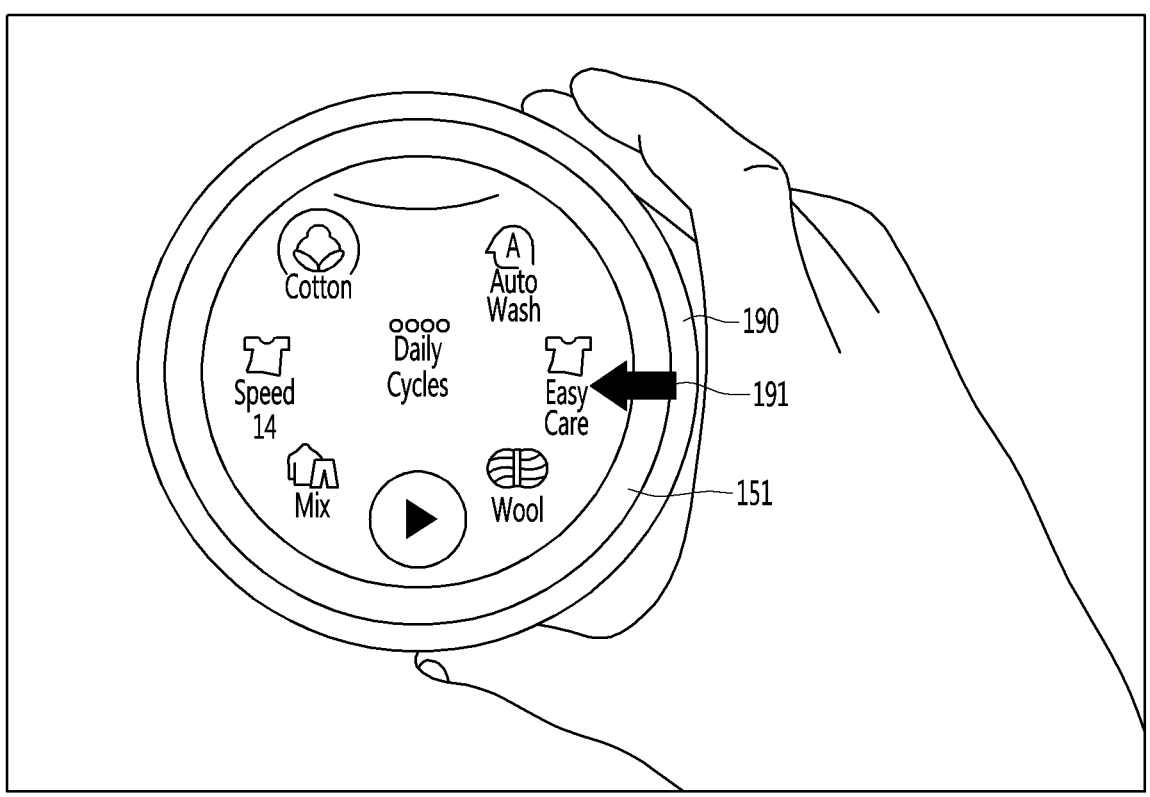
FIG. 5 is a view illustrating an example of a dial type artificial intelligence device according to an embodiment of the present invention.

FIG. 5 is a view illustrating an example of a dial type artificial intelligence device according to an embodiment of the present invention.

Referring FIG. 5, the dial-type artificial intelligence device 100 is shown.

The artificial intelligence device 100 may include an outer body 190 surrounding the display unit 151. The outer body 190 may rotate.

A user may select a specific menu item displayed on the output unit 151 by rotating the outer body 190. Of course, the user may select the specific menu item displayed on the output unit 151 according to touch input.

The artificial intelligence device 100 detects rotation of the outer body and rotate a screen by the amount of detected rotation.

An indicator 191 indicating selection of the specific menu item may be displayed on the output unit 151. When the specific menu item moves to the position of the indicator 191 according to rotation of the outer body 190, the artificial intelligence device 100 may determine that the specific menu item is selected.

The artificial intelligence device 100 may transmit a command for performing operation to the external device according to selection of the specific menu item.

Figure 6:
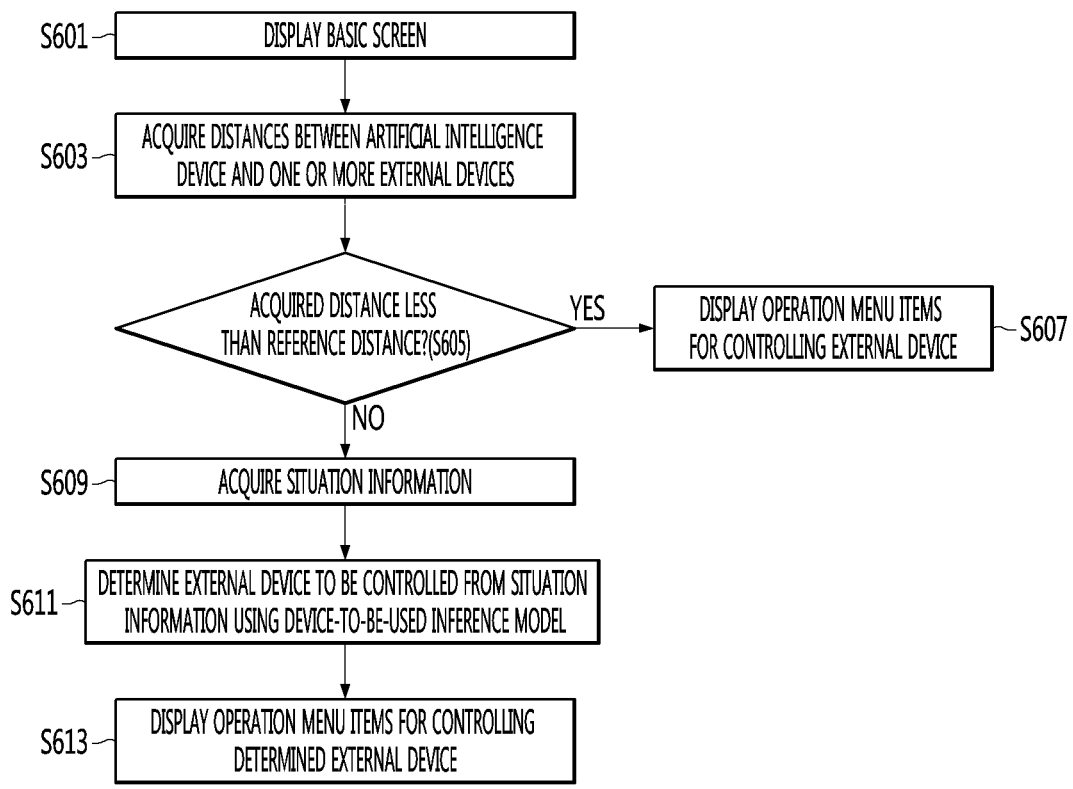
FIG. 6 is a flowchart illustrating a method of operating an artificial intelligence device for controlling an external device according to an embodiment of the present invention.

FIG. 6 is a flowchart illustrating a method of operating an artificial intelligence device for controlling an external device according to an embodiment of the present invention.

The processor 180 of the artificial intelligence device 100 displays a basic screen through the output unit 151 (S601).

In one embodiment, the basic screen may be a time display screen for displaying a current time.

In another embodiment, the basic screen may be a black screen on which no information is displayed.

In another embodiment, the basic screen may be set by user input. The set screen may be any one of an operation menu screen for controlling operation of a specific external device or a screen for executing a specific application.

The processor 180 of the artificial intelligence device 100 acquires distances between the artificial intelligence device 100 and one or more external devices (S603).

The sensing unit 140 may include a distance sensor. The processor 180 may measure a time difference between a signal transmitted from the distance sensor and a signal reflected from the external device. The distance sensor may acquire the distance between the artificial intelligence device 100 and the external device using the measured time difference and the speed of the signal.

When a plurality of external devices is located around the artificial intelligence device 100, the processor 180 may acquire the distance between each of the plurality of external devices and the artificial intelligence device 100.

The processor 180 of the artificial intelligence device 100 determines whether the acquired distance is less than a reference distance (S605).

The reference distance may indicate a reference distance used to determine an object to be controlled by the artificial intelligence device 100. The reference distance may be 10 cm but this is merely an example.

When the acquired distance is less than the reference distance, the processor 180 displays operation menu items for controlling the external device through the output unit 151 (S607).

When there is an external device, the acquired distance of which is less than the reference distance, the processor 180 may display one or more operation menu items for controlling operation of the external device through the output unit 151.

That is, the processor 180 may change the basic screen to one or more operation menu items for controlling the operation of the external device.

When the acquired distance is less than the reference distance, the processor 180 may determine that the intention of the user is an intention of controlling the external device located close to the artificial intelligence device 100.

In another example, when the artificial intelligence device 100 is attached with a specific external device, the processor 180 may determine that the intention of the user is an intention of controlling the specific external device. For example, when the artificial intelligence device 100 is placed on a washing machine, the processor 180 may determine that the user intends to control operation of the washing machine.

In this case, an NFC module provided in the communication unit 110 of the artificial intelligence device 100 and an NFC module provided in the washing machine may recognize each other through communication.

The artificial intelligence device 100 may determine the washing machine as the device to be controlled, when the washing machine is recognized through the NFC module.

When the acquired distance is equal to or greater than the reference distance, the processor 180 acquires situation information (S609).

In one embodiment, the situation information may include one or more of the position of the artificial intelligence device 100, the position of the user or a current time.

The position of the artificial intelligence device 100 may be measured through a position measurement module such as a global positioning system (GPS) module.

When a plurality of zones is present in the house, a camera may be installed in each of the plurality of zones. The processor 180 may receive a plurality of images respectively captured in the plurality of zones from the cameras.

The processor 180 may recognize the user from the plurality of images based on the image recognition model and acquire a zone where the user is recognized as the position of the user.

The image recognition model may be an artificial neural network based model supervised-learned by a deep learning algorithm or a machine learning algorithm. The image recognition model may recognize the face of the user from the image data.

The processor 180 determines an external device to be controlled from the situation information using a device-to-be-used inference model (S611).

The device-to-be-used inference model may be an artificial neural network based model learned using a deep learning algorithm or a machine learning algorithm.

The device-to-be-used inference model may be stored in the memory 170.

The device-to-be-used inference model may be learned by the learning processor 130 of the artificial intelligence device 100. The device-to-be-used inference model may be learned by the AI server 200 and transmitted to and installed in the artificial intelligence device 100.

The device-to-be-used inference model may infer an external device to be controlled from the situation information.

The device-to-be-used inference model may be learned through supervised learning.

Learning data used to train the device-to-be-used inference model may include the usage time of the external device and the position of the user. A training data set may include the learning data and the type of the device labeled therewith.

An input feature vector extracted from the learning data may be input to the device-to-be-used inference model.

The device-to-be-used inference model may output a target feature vector indicating the type of the external device based on the input feature vector.

The device-to-be-used inference model may be learned to minimize a value of a cost function corresponding to a difference between the type of the external device labeled at the user's position and the type of the external device as the result of inference.

The device-to-be-used inference model will be described with reference to FIGS. 7 and 8.

Figure 7:
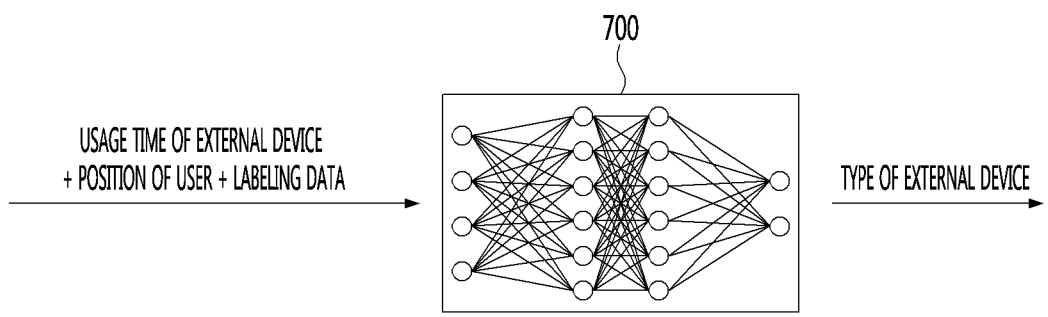
FIG. 7 is a view illustrating an example of a device-to-be-used inference model according to an embodiment of the present invention.

FIG. 7 is a view illustrating an example of a device-to-be-used inference model according to an embodiment of the present invention, and FIG. 8 is a view illustrating a training data set used to learn the device-to-be-used inference model.

FIG. 7 shows an artificial neural network based device-to-be-used inference model 700.

The usage time of the external device, the position of the user and labeling data may be input to the device-to-be-used inference model 700 as the training data set. The training data set may be converted into a feature vector and input to the device-to-be-used inference model 700.

The device-to-be-used inference model 700 may be learned to output the type of the external device based on the training data set and to minimize a cost function corresponding to a difference between the output type of the external device and the labeling data.

The type of the external device indicates what type of external device is used and may be represented by an encoded number. For example, a TV may be represented by 1, an air conditioner may be represented by 2 and a washing machine may be represented by 3.

FIG. 8 shows an example of the training data set used to train the device-to-be-used inference model.

The usage time of the device and the position of the user as learning data are labeled with the type of the external device.

For example, when the user is located in a main room from 8:00 to 10:00, the labeling data is a TV.

When the user is located in a living room from 10:00 to 12:00, the labeling data is an air conditioner.

When the user is located in a living room from 12:00 to 13:00, the labeling data is a washing machine.

The device-to-be-used inference model 700 may automatically determine an external device to be controlled according to the situation or behavior pattern of the user.

FIG. 6 will be described again.

The processor 180 may display operation menu items for controlling the determined external device on the output unit 151 (S613).

The operation menu items may be specialized menu items for controlling operation of the external device determined as the device to be controlled.

In another example, when the external device to be controlled is determined, the processor 180 may execute an application for controlling the determined external device. The application for controlling the external device may be installed in the artificial intelligence device 100.

Figure 9:
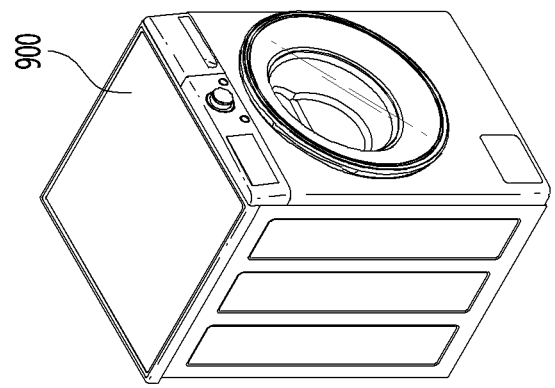
FIG. 9 is a view illustrating an example in which an artificial intelligence device controls an adjacent washing machine according to an embodiment of the present invention.
Figure 9:
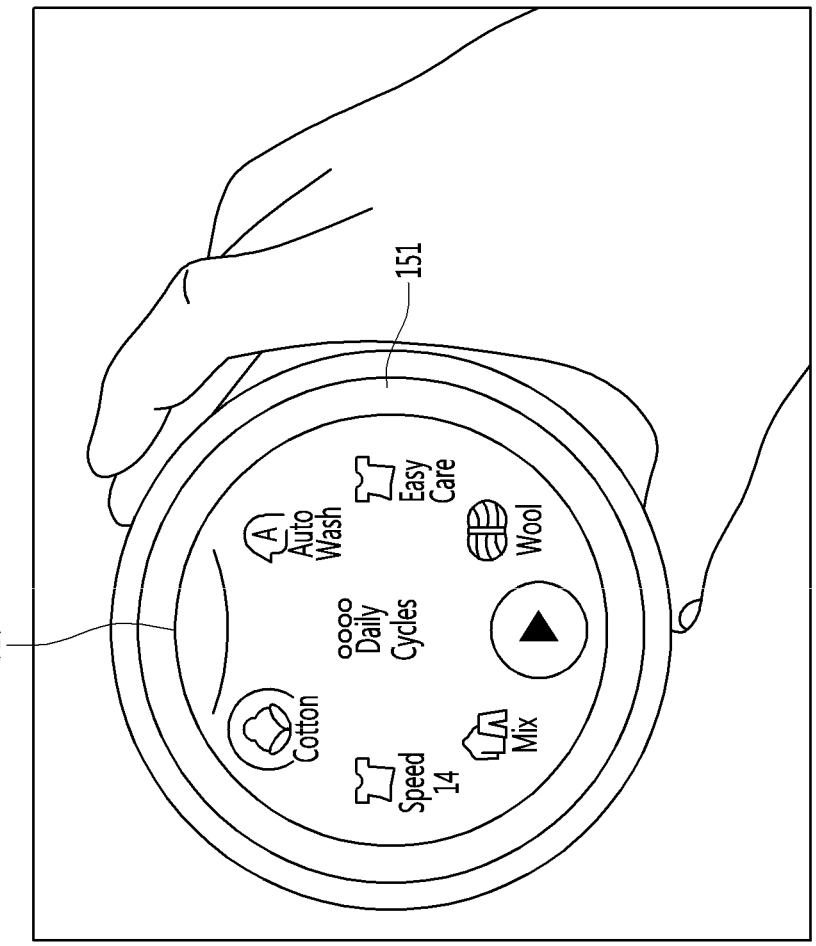

FIG. 9 is a view illustrating an example in which an artificial intelligence device controls an adjacent washing machine according to an embodiment of the present invention.

Assume that the washing machine 900 includes all the components shown in FIG. 4.

Referring to FIG. 9, when the distance between the artificial intelligence device 100 and the washing machine 900 is less than the reference distance, the artificial intelligence device 100 may display an operation screen for controlling operation of the washing machine 900 on the output unit 151.

The operation screen 910 may include a plurality of operation menu items for controlling operation of the washing machine 900.

When any one of the plurality of operation menu items is selected, the artificial intelligence device 100 may transmit a control signal for performing operation corresponding to the selected menu item to the washing machine 900.

To this end, each of the communication unit 110 of the artificial intelligence device 100 and the washing machine 900 may include a short-range wireless communication module. The short-range wireless communication module may be a Bluetooth module or a Wi-Fi module but this is merely an example.

The user may select any one of the plurality of operation menu items, thereby easily controlling operation of the washing machine 900.

According to the embodiment of the present invention, the user can easily control the external device through the artificial intelligence device 100, by only moving to a place close to the external device.

In addition, the external device does not need to have buttons corresponding to the operation menu items, thereby reducing the manufacturing cost of the external device and simplifying design.

Figure 10:
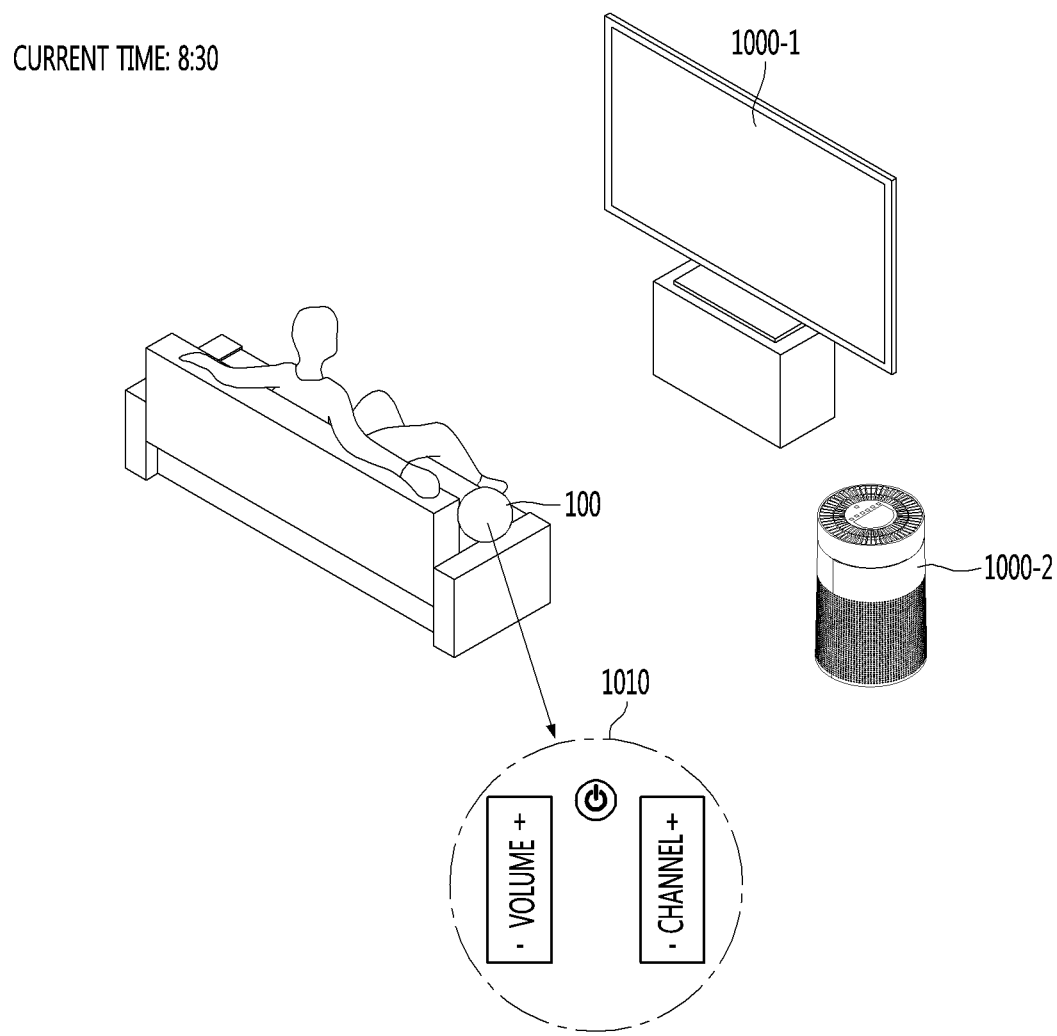
FIG. 10 is a view illustrating an example of determining a device to be controlled based on situation information when a distance between an artificial intelligence device and an external device is equal to or greater than a reference distance according to an embodiment of the present invention.

FIG. 10 is a view illustrating an example of determining a device to be controlled based on situation information when a distance between an artificial intelligence device and an external device is equal to or greater than a reference distance according to an embodiment of the present invention.

Referring to FIG. 10, assume that the current time is 8:30 and the user is located in a living room.

In addition, a TV 1000-1 and an air cleaner 1000-2 are disposed in the living room as external devices.

The artificial intelligence device 100 may measure a first distance between the artificial intelligence device 100 and the TV 1000-1 and a second distance between the artificial intelligence device 100 and the air cleaner 1000-2 through the distance sensor.

When each of the first distance and the second distance is less than the reference distance, the artificial intelligence device 100 may collect the situation information.

The situation information may include the position (living room) of the user and the current time (8:30).

The artificial intelligence device 100 may determine a device to be controlled from the situation information using the device-to-be-used inference model.

The artificial intelligence device 100 may determine the TV 1000-1 as the type of the external device corresponding to the situation information using the device-to-be-used inference model.

The artificial intelligence device 100 may display an operation screen 1010 including the operation menu items for controlling operation of the TV 1000-1 determined as the device to be controlled.

That is, the artificial intelligence device 100 may switch the basic screen to the operation screen 1010.

The operation screen 1010 may include a power button for controlling power of the TV 1000-1, a volume control button for controlling a volume and a channel button for changing a channel.

The user can easily control operation of the TV 1000-1 through the operation screen of the artificial intelligence device 100 without a separate remote controller.

The artificial intelligence device 100 according to the embodiment of the present invention may provide the operation screen of the device to be controlled according to the situation and provide the effect of conveniently controlling operation of the external device to the user.

Next, FIG. 11 will be described.

Figure 11:
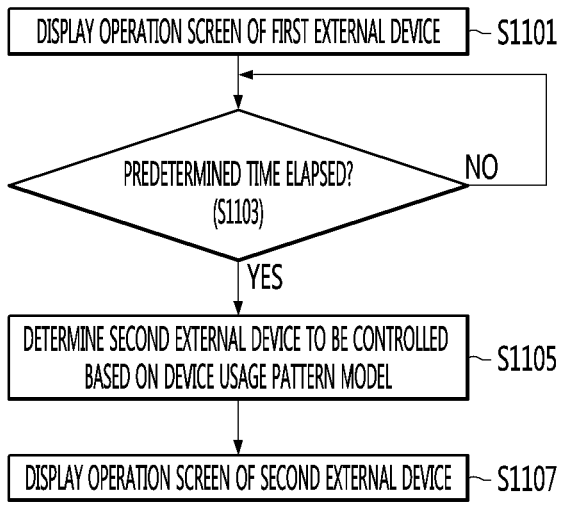
FIG. 11 is a flowchart illustrating a method of operating an artificial intelligence device for controlling an external device according to another embodiment of the present invention.

FIG. 11 is a flowchart illustrating a method of operating an artificial intelligence device for controlling an external device according to another embodiment of the present invention.

In particular, FIG. 11 relates to a method of determining a device to be controlled based on a user's usage pattern of an external device.

Referring to FIG. 11, the processor 180 of the artificial intelligence device 100 displays the operation screen of a first external device on the output unit 151 (S1101).

That is, the user controls operation of the first external device through the operation screen of the first external device.

The processor 180 determines whether a predetermined time has elapsed (S1103).

When the predetermined time has elapsed, the processor 180 determines a second external device to be controlled next based on a device usage pattern model (S1105).

The device usage pattern model may be an artificial neural network based model learned by a deep learning algorithm or a machine learning algorithm.

The device usage pattern model may infer an external device to be used next from a currently used external device.

That is, the device usage pattern model may determine a device to be controlled according to the usage pattern of the external device.

The device usage pattern model may be stored in the memory 170.

A training data set used to train the device usage pattern model may include the type of the currently used external device and the type of another external device labeled therewith.

The processor 180 displays the operation screen of the determined second external device on the output unit 151 (S1107).

The processor 180 may switch the operation screen of the first external device to the operation screen of the second external device.

As the operation screen of the external device to be controlled next is provided in consideration of the device usage pattern of the user, the user can conveniently control the external devices according to the usage patterns thereof without separate input.

According to the embodiment of the present invention, the artificial intelligence device 100 may simultaneously control operations of a plurality of external devices through the operation screen.

Figure 12A:
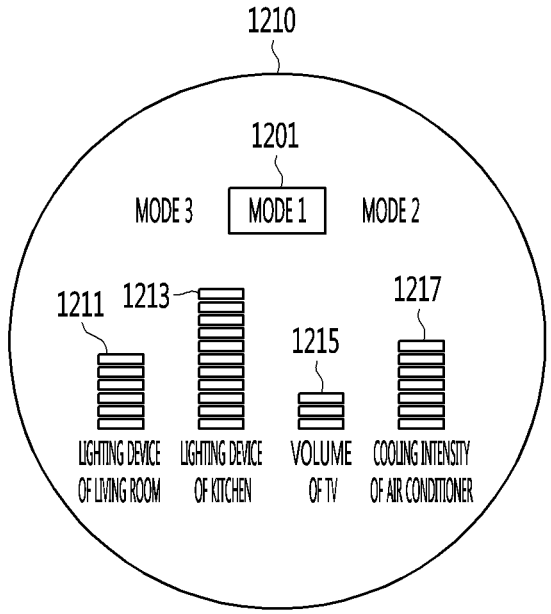
FIGS. 12a and 12b are views illustrating a process of simultaneously controlling operations of a plurality of external devices according to an embodiment of the present invention.
Figure 12B:
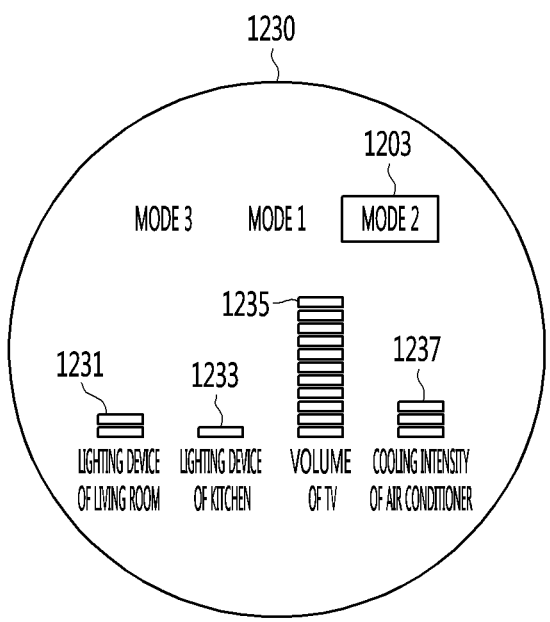

FIGS. 12a and 12b are views illustrating a process of simultaneously controlling operations of a plurality of external devices according to an embodiment of the present invention.

Referring to FIGS. 12a and 12b, multi-operation screens displayed on the output unit 151 of the artificial intelligence device 100 are shown.

In FIGS. 12a and 12b, the plurality of external devices may include a lighting device disposed in a living room, a lighting device disposed in a kitchen, a TV and an air conditioner.

Referring to FIG. 12a, a first multi-operation screen 1210 may include first setting item sets 1211 to 1217 for controlling a plurality of external devices in a first mode.

When a first mode button 1210 for operation in the first mode is selected on the first multi-operation screen 1210, the artificial intelligence device 100 may switch the operation setting values of the plurality of external devices to the first setting item sets 1211 to 1217.

The first setting item sets 1211 to 1217 may include an item 1211 indicating the brightness of the lighting device disposed in the living room, an item 1213 indicating the brightness of the lighting device disposed in the kitchen, an item 1215 indicating the volume of the TV and an item 1217 indicating the cooling intensity of the air conditioner.

That is, the setting values of the plurality of external devices may be predetermined in the first mode. The setting values of the plurality of external devices may be predetermined by the user.

However, the present invention is not limited thereto and the user may control the setting value of each item configuring the first setting item sets through user input.

Next, FIG. 12b will be described.

Referring to FIG. 12b, a second multi-operation screen 1230 may include second setting item sets 1231 to 1237 for controlling the plurality of external devices in a second mode.

When a second mode button 1203 for operation in the second mode is selected on the first multi-operation screen 1210, the artificial intelligence device 100 may switch the operation setting values of the plurality of external devices from the first setting item sets 1211 to 1217 to the second setting item sets 1231 to 1237.

That is, in the second mode, the setting values of the plurality of external devices may be predetermined. The setting values of the plurality of external devices may be predetermined.

However, the present invention is not limited thereto and the user may control the setting value of each item configuring the second setting item sets through user input.

According to the embodiment of the present invention, it is possible to simplify a process of, at the user, controlling the external devices by providing the setting situations of the plurality of external devices at one time.

According to the embodiment of the present invention, the user can easily control the external device through the artificial intelligence device, by only moving to a place close to the external device.

The artificial intelligence device according to the embodiment of the present invention may provide the operation screen of the device to be controlled according to the situation and provide the effect of conveniently controlling operation of the external device to the user.

In addition, the external device does not need to have buttons corresponding to the operation menu items, thereby reducing the manufacturing cost of the external device and simplifying design.

The present invention mentioned in the foregoing description can also be embodied as computer readable codes on a computer-readable recording medium. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc. The computer may include the controller 180 of the AI device.

What is claimed is:

1. An artificial intelligence device for controlling an external device, the artificial intelligence device comprising:
a short-range communication circuit;
a display unit; and
a processor configured to:
acquire distances between the artificial intelligence device and a plurality of external devices,
in response to one external device among the plurality of external devices being less than a reference distance away from the artificial intelligence device, display a first operation menu item for controlling the one external device on the display unit,
in response to all of the plurality of external devices being equal to or greater than the reference distance away from the artificial intelligence device, acquire first situation information including a position of a user and one or more device usage times of the user at the position, determine a first selected external device among the plurality of external devices based on the first situation information and display a second operation menu item for controlling the first selected external device on the display unit, and in response to at least two external devices among the plurality of external devices being less than the reference distance away from the artificial intelligence device, acquire second situation information including the position of the user and device usage times of the at least two external devices by the user at the position, determine a second selected external device among the at least two external devices based on the second situation information, and display a third operation menu item for controlling the second selected external device on the display unit.

2. The artificial intelligence device of claim 1, further comprising a memory configured to store a device-to-be-used inference model for determining a device to be controlled from situation information,
wherein the device-to-be-used inference model is an artificial neural network based model supervised-learned by a deep learning algorithm or a machine learning algorithm.

3. The artificial intelligence device of claim 2, wherein a training data set used to train the device-to-be-used inference model includes the position of the user, a device usage time, and a type of an external device as labeling data.

4. The artificial intelligence device of claim 1, further comprising a distance sensor configured to measure a distance between an external device and the artificial intelligence device.

5. The artificial intelligence device of claim 1, further comprising a short-range wireless communication module,
wherein, when the first operation menu item is selected, the processor transmits a command for performing an operation corresponding to the selected operation menu item to the one external device through the short-range wireless communication module.

6. The artificial intelligence device of claim 1, wherein the display unit:
displays a basic screen, and
switches the basic screen to an operation screen of the one external device including the first operation menu item when an acquired distance between the artificial intelligence device and the one external device is less than the reference distance.

7. The artificial intelligence device of claim 1, further comprising a rotatable outer body surrounding the display unit,
wherein the processor selects the first operation menu item according to a rotation of the outer body.

8. The artificial intelligence device of claim 1, wherein the processor is further configured to:
in response to the artificial intelligence device being placed on the one external device, recognize the one external device through the short-range communication circuit and determine the one external device as a device to be controlled by the artificial intelligence device.

9. The artificial intelligence device of claim 1, wherein the processor is further configured to:
display a multi-operation screen including a first mode item and a second mode item, in response to a selection of the first mode item, control four external devices according to a first set of predetermined values, and
in response to a selection of the second mode item, control the four external devices according to a second set of predetermined values,
wherein the first set of predetermined values is different than the second set of predetermined values.

10. A method of operating an artificial intelligence device for controlling an external device, the method comprising:
acquiring, by a processor in the artificial intelligence device, distances between the artificial intelligence device and a plurality of external devices;
in response to one external device among the plurality of external devices being less than a reference distance away from the artificial intelligence device, displaying a first operation menu item for controlling the one external device on a display unit of the artificial intelligence device;
in response to all of the plurality of external devices being equal to or greater than the reference distance away from the artificial intelligence device, acquiring, by the processor, first situation information including a position of a user and one or more device usage times of the user at the position, determining a first selected external device among the plurality of external devices based on the first situation information and displaying a second operation menu item for controlling the first selected external device on the display unit; and
in response to at least two external devices among the plurality of external devices being less than the reference distance away from the artificial intelligence device, acquiring, by the processor, second situation information including the position of the user and device usage times of the at least two external devices by the user at the position, determining a second selected external device among the at least two external devices based on the second situation information and displaying a third operation menu item for controlling the second selected external device on the display unit.

11. The method of claim 10, further comprising storing a device-to-be-used inference model for determining a device to be controlled from situation information,
wherein the device-to-be-used inference model is an artificial neural network based model supervised-learned by a deep learning algorithm or a machine learning algorithm.

12. The method of claim 11, wherein a training data set used to train the device-to-be-used inference model includes the position of the user, a device usage time, and a type of the external device as labeling data.

13. The method of claim 10, further comprising measuring a distance between an external device and the artificial intelligence device through a distance sensor.

14. The method of claim 10, further comprising, when the first operation menu item is selected, transmitting a command for performing operation corresponding to the selected operation menu item to the one external device.

15. The method of claim 10, further comprising:
displaying a basic screen, and
switching the basic screen to an operation screen of the one external device including the first operation menu item when an acquired distance between the artificial intelligence device and the one external device is less than the reference distance.

16. The method of claim 10,
wherein the artificial intelligence device further includes a rotatable outer body surrounding the display unit, and
wherein the method further includes selecting the first operation menu item according to a rotation of the outer body.

17. The method of claim 10, further comprising:
in response to the artificial intelligence device being placed on the one external device, recognize the one external device through the short-range communication circuit and determine the one external device as a device to be controlled by the artificial intelligence device.

18. The method of claim 10, further comprising:
displaying a multi-operation screen including a first mode item and a second mode item;
in response to a selection of the first mode item, controlling four external devices according to a first set of predetermined values; and
in response to a selection of the second mode item, controlling the four external devices according to a second set of predetermined values,
wherein the first set of predetermined values is different than the second set of predetermined values.

* * * * *

UNITED STATES PATENT AND TRADEMARK OFFICE
CERTIFICATE OF CORRECTION

| | |
|---|---|
| PATENT NO. | : 11,748,614 B2 |
| APPLICATION NO. | : 16/562956 |
| DATED | : September 5, 2023 |
| INVENTOR(S) | : Dongwook Kim et al. |

It is certified that error appears in the above-identified patent and that said Letters Patent is hereby corrected as shown below:

On the Title Page

After the Prior Publication Data (65) section, please insert:
-- (30) Foreign Application Priority Data
Aug. 2, 2019 (KR) ......................... 10-2019-0094273 --

Signed and Sealed this
Twenty-ninth Day of October, 2024

Katherine Kelly Vidal
*Director of the United States Patent and Trademark Office*